(12) United States Patent
Iwata et al.

(10) Patent No.: US 10,174,200 B2
(45) Date of Patent: Jan. 8, 2019

(54) EPOXY RESIN COMPOSITION FOR FIBER-REINFORCED COMPOSITE MATERIAL, METHOD FOR PRODUCING EPOXY RESIN COMPOSITION FOR FIBER-REINFORCED COMPOSITE MATERIAL, PREPREG, AND HONEY-COMB PANEL

(71) Applicant: The Yokohama Rubber Co., LTD., Minato-ku, Tokyo (JP)

(72) Inventors: Mitsuhiro Iwata, Hiratsuka (JP); Tomohiro Ito, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/512,509

(22) PCT Filed: Jun. 9, 2015

(86) PCT No.: PCT/JP2015/066583
§ 371 (c)(1),
(2) Date: Mar. 17, 2017

(87) PCT Pub. No.: WO2016/042857
PCT Pub. Date: Mar. 24, 2016

(65) Prior Publication Data
US 2017/0292023 A1     Oct. 12, 2017

(30) Foreign Application Priority Data

Sep. 19, 2014    (JP) .................................. 2014-191272

(51) Int. Cl.
*C08L 85/02*     (2006.01)
*C08L 63/00*     (2006.01)
(Continued)

(52) U.S. Cl.
CPC ................ *C08L 85/02* (2013.01); *B32B 3/12* (2013.01); *B32B 5/24* (2013.01); *B32B 5/28* (2013.01);
(Continued)

(58) Field of Classification Search
None
See application file for complete search history.

(56) References Cited

U.S. PATENT DOCUMENTS

2009/0018241 A1    1/2009   Cheng et al.
2009/0072207 A1    3/2009   Cho et al.
(Continued)

FOREIGN PATENT DOCUMENTS

EP       2 439 222      4/2012
JP       S58-206624    12/1983
(Continued)

OTHER PUBLICATIONS

International Search Report for International Application No. PCT/JP2015/066583 dated Sep. 15, 2015, 4 pages, Japan.
(Continued)

*Primary Examiner* — Randy P Gulakowski
*Assistant Examiner* — Ha S Nguyen
(74) *Attorney, Agent, or Firm* — Thorpe North & Western

(57) ABSTRACT

The present technology provides an epoxy resin composition for a fiber-reinforced composite material, a method for producing an epoxy resin composition for a fiber-reinforced composite material, a prepreg, and a honeycomb panel. The epoxy resin composition for a fiber-reinforced composite material of the present technology contains: a reaction product obtained by reacting 100 parts by mass of a phosphorus-containing epoxy resin containing a phosphorus atom in the backbone thereof, and not less than 5 parts by mass and not greater than 20 parts by mass of an amino-
(Continued)

terminated butadiene-acrylonitrile rubber; an epoxy resin other than the phosphorus-containing epoxy resin; a curing agent; and a curing accelerator.

20 Claims, 2 Drawing Sheets

(51) Int. Cl.
  *C08G 59/56* (2006.01)
  *C08G 59/20* (2006.01)
  *C08J 5/24* (2006.01)
  *B32B 5/24* (2006.01)
  *B32B 27/38* (2006.01)
  *B32B 5/28* (2006.01)
  *B32B 3/12* (2006.01)

(52) U.S. Cl.
  CPC .............. *B32B 27/38* (2013.01); *C08G 59/20* (2013.01); *C08G 59/56* (2013.01); *C08J 5/24* (2013.01); *C08J 2385/02* (2013.01); *C08J 2409/00* (2013.01); *C08J 2461/06* (2013.01); *C08J 2463/02* (2013.01); *C08L 2205/035* (2013.01)

(56) References Cited

U.S. PATENT DOCUMENTS

| | | | |
|---|---|---|---|
| 2012/0071585 A1 | 3/2012 | Nohara et al. | |
| 2014/0010979 A1 | 1/2014 | Tomioka et al. | |
| 2014/0107254 A1* | 4/2014 | Iwata | C08J 5/24 523/400 |

FOREIGN PATENT DOCUMENTS

| | | | |
|---|---|---|---|
| JP | S61-004721 | 1/1986 | |
| JP | H05-339343 | 12/1993 | |
| JP | H11-279238 | 10/1999 | |
| JP | 2002-012739 | 1/2002 | |
| JP | 2005-015582 | 1/2005 | |
| JP | 2009-067987 | 4/2009 | |
| JP | 2009/527632 | 7/2009 | |
| JP | 2011/099094 | 5/2011 | |
| JP | 2012-219223 | 11/2012 | |
| JP | 2012-233133 | 11/2012 | |
| KR | 10-2013-0118382 | 10/2013 | |
| WO | WO 2007/100734 | 9/2007 | |
| WO | WO 2010/140351 | 12/2010 | |
| WO | WO 2012/153595 | 11/2012 | |
| WO | WO-2012153595 A1 * | 11/2012 | ............... C08J 5/24 |
| WO | WO 2013/142751 * | 9/2013 | |
| WO | WO-2013142751 A2 * | 9/2013 | ............ C09J 163/00 |

OTHER PUBLICATIONS

N. Chikhi et al., Modification of epoxy resin using reactive liquid (ATBN) rubber, journal, Jul. 11, 2001, 251-264, Eurpoean Polymer Journal, Algeria.

Xiao Wang et al., Study on the synthesis and properties of a phosphorous containing epoxy resin, Jan. 2009, vol. 24 No. 1, China.

* cited by examiner

EPOXY RESIN COMPOSITION FOR FIBER-REINFORCED COMPOSITE MATERIAL, METHOD FOR PRODUCING EPOXY RESIN COMPOSITION FOR FIBER-REINFORCED COMPOSITE MATERIAL, PREPREG, AND HONEY-COMB PANEL

TECHNICAL FIELD

The present technology relates to an epoxy resin composition for a fiber-reinforced composite material, a method for producing an epoxy resin composition for a fiber-reinforced composite material, a prepreg, and a honeycomb panel. More particularly, the present technology relates to an epoxy resin composition for a fiber-reinforced composite material which yields a material having excellent honeycomb sandwich peel strength and flame retardancy and has excellent storage stability, a method for producing an epoxy resin composition for a fiber-reinforced composite material, a prepreg, and a honeycomb panel.

BACKGROUND ART

An epoxy resin composition for a fiber-reinforced composite material containing a phosphorus-containing epoxy resin, dicyandiamide as a curing agent, and a curing accelerator having a specific structure has been proposed in the past (for example, see Japanese Unexamined Patent Application Publication No. 2012-233133A). By setting the compounded amount of the phosphorus-containing epoxy resin to within a prescribed range in this epoxy resin composition for a fiber-reinforced composite material, it is possible to prevent decreases in the strength of the cured product and to achieve sufficient flame retardancy without using halogen-containing compounds, antimony trioxide, and the like. In addition, using a curing accelerator having a specific structure in combination with dicyandiamide as a curing agent makes it possible to realize curability at low temperatures and excellent storage stability.

Incidentally, in the field of structural materials and interior materials for aircraft, fiber-reinforced composite materials are widely used as a face plate for a honeycomb panel from the perspective of weight reduction. In recent years, self-adhesive technology for directly adhering a honeycomb core and a prepreg obtained using an epoxy resin composition for a fiber-reinforced composite material has come into the spot light in order to further reduce the weight and production cost of honeycomb panels.

However, in the case of the epoxy resin composition for a fiber-reinforced composite material described in Japanese Unexamined Patent Application Publication No. 2012-233133A, although it is possible to reduce the environmental impact because halogen-containing compounds and antimony trioxide are not used, it is not necessarily possible to achieve sufficient adhesiveness with respect to the honeycomb core. Therefore, there is a demand for an epoxy resin composition for a fiber-reinforced composite material which yields excellent flame retardancy without using halogen-containing compounds and antimony trioxide, has excellent curability at low temperatures and storage stability, and yields high adhesiveness with respect to a honeycomb panel.

SUMMARY

The present technology provides an epoxy resin composition for a fiber-reinforced composite material which is curable at low temperatures, has excellent flame retardancy and storage stability, and yields a cured product having excellent adhesiveness with a honeycomb core, a method for producing an epoxy resin composition for a fiber-reinforced composite material, a prepreg, and a honeycomb panel.

The epoxy resin composition for a fiber-reinforced composite material of the present technology contains: a reaction product obtained by reacting 100 parts by mass of a phosphorus-containing epoxy resin containing a phosphorus atom in the backbone, and not less than 5 parts by mass and not greater than 20 parts by mass of an amino-terminated liquid rubber; an epoxy resin other than the phosphorus-containing epoxy resin; a curing agent; and a curing accelerator.

With this epoxy resin composition for a fiber-reinforced composite material, a prescribed amount of an amino-terminated liquid rubber having high reactivity is reacted with a phosphorus-containing epoxy resin having moderately low reactivity, so a reaction product in which moderate crosslinking is established between the phosphorus-containing epoxy resin and the amino-terminated liquid rubber is obtained. Furthermore, because an epoxy resin having higher reactivity than the phosphorus-containing epoxy resin, a curing agent, and a curing accelerator are compounded with this reaction product, sufficient crosslinking is established in the cured product of the epoxy resin composition for a fiber-reinforced composite material. As a result, it is possible to realize an epoxy resin composition for a fiber-reinforced composite material which is curable at a low temperature of approximately 120° C., yields excellent flame retardancy without using halogen-containing compounds and antimony trioxide, has excellent storage stability, and yields a cured product having excellent adhesiveness with a honeycomb core.

In the epoxy resin composition for a fiber-reinforced composite material of the present technology, the amino-terminated liquid rubber is preferably an amino-terminated butadiene-acrylonitrile rubber.

In the epoxy resin composition for a fiber-reinforced composite material of the present technology, the curing accelerator preferably contains at least one type selected from the group consisting of phenylurea-based compounds represented by Formula (1) below.

Formula (1)

(In Formula (1), $R_1$ is a phenyl group which may have a substituent. $R_1$ may have one or more substituents such as an alkyl group such as a methyl group, an alkylene group, a uranyl group, and a halogen such as chlorine and bromine. $R_2$ and $R_3$ are alkyl groups which may have branches with not less than 1 and not greater than 5 carbons. $R_2$ and $R_3$ may be the same as or different from one another.)

In the epoxy resin composition for a fiber-reinforced composite material of the present technology, the curing agent is preferably dicyandiamide.

In the epoxy resin composition for a fiber-reinforced composite material of the present technology, the phosphorus content of the phosphorus-containing epoxy resin is preferably not less than 0.5 mass % and not greater than 5.0 mass %.

In the epoxy resin composition for a fiber-reinforced composite material of the present technology, the content of the curing accelerator is preferably not less than 1 part by mass and not greater than 15 parts by mass per 100 parts by mass of the sum of the mass of the phosphorus-containing epoxy resin and the mass of the other epoxy resin.

The epoxy resin composition for a fiber-reinforced composite material of the present technology preferably further contains a phenoxy resin.

In the epoxy resin composition for a fiber-reinforced composite material of the present technology, the content of the phenoxy resin is preferably not less than 5 parts by mass and not greater than 40 parts by mass per 100 parts by mass of the sum of the mass of the phosphorus-containing epoxy resin and the mass of the other epoxy resin.

The method for producing an epoxy resin composition for a fiber-reinforced composite material according to the present technology includes: reacting a phosphorus-containing epoxy resin and an amino-terminated liquid rubber for not less than 10 minutes and not greater than 3 hours at a reaction temperature of not lower than 100° C. and not higher than 200° C. to obtain a reaction product; and mixing the reaction product, a curing agent, and a curing accelerator to obtain an epoxy resin composition for a fiber-reinforced composite material.

The prepreg of the present technology is obtained by impregnating a reinforced fiber with the epoxy resin composition for a fiber-reinforced composite material.

The honeycomb panel of the present technology is obtained by laminating and curing the prepreg with a honeycomb core.

In the honeycomb panel of the present technology, the honeycomb core is preferably at least one type selected from the group consisting of an aramid honeycomb, an aluminum honeycomb, a paper honeycomb, and a glass honeycomb.

With the present technology, it is possible to achieve an epoxy resin composition for a fiber-reinforced composite material which is curable at low temperatures, has excellent flame retardancy and storage stability, and yields a cured product having excellent adhesiveness with a honeycomb core, a method for producing an epoxy resin composition for a fiber-reinforced composite material, a prepreg, and a honeycomb panel.

DETAILED DESCRIPTION

Figure 1:
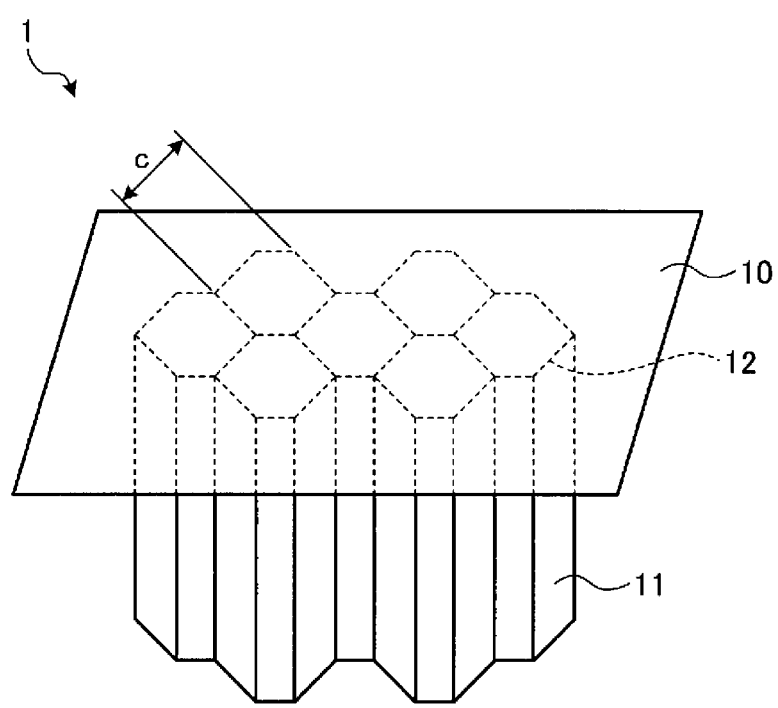
FIG. 1 is a schematic perspective view illustrating an example of a honeycomb panel according to an embodiment of the present technology.

Embodiments of the present technology will be described in detail hereinafter. Note that the present technology is not limited by the following embodiments. Moreover, the constituents described in the embodiments can be combined as desired.

The epoxy resin composition for a fiber-reinforced composite material of the present technology contains: a reaction product obtained by reacting 100 parts by mass of a phosphorus-containing epoxy resin containing a phosphorus atom in the backbone, and not less than 5 parts by mass and not greater than 20 parts by mass of an amino-terminated liquid rubber; an epoxy resin other than the phosphorus-containing epoxy resin; a curing agent; and a curing accelerator.

With the epoxy resin composition for a fiber-reinforced composite material, a prescribed amount of an amino-terminated liquid rubber having high reactivity is reacted with a phosphorus-containing epoxy resin having moderately low reactivity, so a reaction product in which moderate crosslinking is established between the phosphorus-containing epoxy resin and the amino-terminated liquid rubber is obtained. Furthermore, because an epoxy resin having higher reactivity than that of the phosphorus-containing epoxy resin, a curing agent, and a curing accelerator are compounded with this reaction product, sufficient crosslinking is established in the cured product of the epoxy resin composition for a fiber-reinforced composite material. As a result, it is possible to realize an epoxy resin composition for a fiber-reinforced composite material which is curable at a low temperature of approximately 120° C., yields excellent flame retardancy without using halogen-containing compounds and antimony trioxide, has excellent storage stability, and yields a cured product having excellent adhesiveness with a honeycomb core. Various components of the epoxy resin composition for a fiber-reinforced composite material of the present technology (also simply called an "epoxy resin composition" hereafter) will be described hereinafter.

Phosphorus-Containing Epoxy Resin

A compound represented by Formula (2) below is preferable as a phosphorus-containing epoxy resin from the perspective of the flame retardancy of a cured product obtained using the epoxy resin composition.

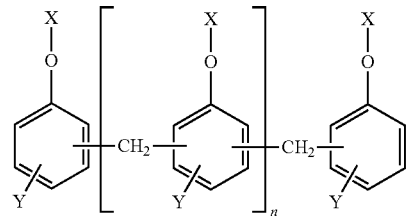

Formula (2)

(In Formula (2), n is an integer greater than or equal to 1. X is a substituent represented by Formula (3), Formula (4) or Formula (5) below, and each of (n+2) moieties of X in Formula (2) may be the same as or different from one another. Provided that at least one of all of the X moieties in the epoxy resin is a substituent represented by Formula (3) or Formula (4) below, and at least one is a substituent represented by Formula (5) below. Y is —H or —CH$_3$, and the (n+2) moieties of Y in Formula (2) may be the same as or different from one another.)

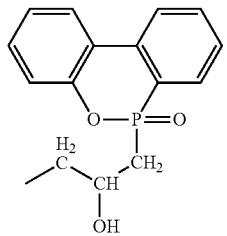

Formula (3)

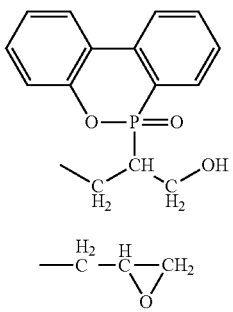

Formula (4)

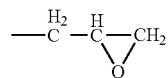

Formula (5)

In Formula (2), n is an integer greater than or equal to 1, and n is preferably not less than 1 and not greater than 10 and more preferably not less than 1 and not greater than 5. When n is not greater than 10, the composition has an excellent balance of heat resistance and fluidity.

The phosphorus-containing epoxy resin may be composed of only a compound in which some of the (n+2) moieties of X in Formula (2) are substituents represented by Formula (3) or Formula (4) below and some are substituents represented by Formula (5) above, or the phosphorus-containing epoxy resin may be a mixture of a compound in which some or all of the (n+2) moieties of X in Formula (2) are substituents represented by Formula (3) or Formula (4) above and a compound in which all of the moieties of X are substituents represented by Formula (5) above.

A commercially available product may be used as the phosphorus-containing epoxy resin, or a composition synthesized by a publicly known production method may be used. Examples of the commercially available products include trade names FX-289z1 and FX-0921 (manufactured by Nippon Steel & Sumikin Chemical Co., Ltd.). An example of a method for producing a phosphorus-containing epoxy resin is a method of reacting a compound represented by Formula (6) below (9,10-dihydro-9-oxa-10-phosphaphenanthrene-10-oxide (also called "DOPO" hereafter)) with an epoxy resin in which all of the (n+2) moieties of X in Formula (2) are substituents represented by Formula (5) above (for example, a phenol novolac epoxy resin or a cresol novolac epoxy resin) at a high temperature in the presence of a catalyst. At this time, the amount of DOPO that is used is an amount so that some of the epoxy groups in the epoxy resin of the raw material remain after the reaction. One type of phosphorus-containing epoxy resin may be used alone, or two or more types may be used in combination.

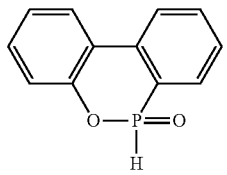

Formula (6)

The phosphorus content of the phosphorus-containing epoxy resin is preferably not less than 0.5 mass %, more preferably not less than 0.75 mass %, and even more preferably not less than 1.0 mass % with respect to the total mass of the epoxy resin composition from the perspective of enhancing the flame retardancy of a cured product of the obtained resin composition and is preferably not greater than 5.0 mass % and even more preferably not greater than 3.0 mass % from the perspective of preventing a reduction in curability at low temperatures. Taking the above into consideration, the phosphorus content of the phosphorus-containing epoxy resin is preferably not less than 0.5 mass % and not greater than 5.0 mass %, more preferably not less than 0.75 mass % and not greater than 3.0 mass %, and even more preferably not less than 1.0 mass % and not greater than 3.0 mass % with respect to the total mass of the epoxy resin composition.

The compounded amount of the phosphorus-containing epoxy resin is preferably not less than 50 parts by mass, more preferably not less than 55 parts by mass, and even more preferably not less than 60 parts by mass per 100 parts by mass of the total amount of the phosphorus-containing epoxy resin and epoxy resins other than the phosphorus-containing epoxy resin (bis F-type epoxy resins, bis A-type epoxy resins, and other epoxy resins) contained in the epoxy resin composition from the perspective of ensuring a high phosphorus content of the epoxy resin composition and imparting sufficient flame retardancy, and is preferably not greater than 95 parts by mass, more preferably not greater than 90 parts by mass, and even more preferably not greater than 85 parts by mass from the perspective of imparting moderate viscosity and handleability to the epoxy resin composition. Taking the above into consideration, the compounded amount of the phosphorus-containing epoxy resin is preferably not less than 50 parts by mass and not greater than 95 parts by mass, more preferably not less than 55 parts by mass and not greater than 90 parts by mass, and even more preferably not less than 60 parts by mass and not greater than 85 parts by mass.

The compounded amount of the phosphorus-containing epoxy resin is preferably not less than 30 mass %, more preferably not less than 35 mass %, and even more preferably not less than 40 mass % with respect to the total mass of the epoxy resin composition from the perspective of enhancing a high phosphorus content of the epoxy resin composition and imparting sufficient flame retardancy, and is preferably not greater than 80 mass %, more preferably not greater than 75 mass %, and even more preferably not greater than 70 mass % from the perspective of imparting moderate viscosity and handleability to the epoxy resin composition. Taking the above into consideration, the compounded amount of the phosphorus-containing epoxy resin is preferably not less than 30 mass % and not greater than 80 mass %, more preferably not less than 35 mass % and not greater than 75 mass %, and even more preferably not less than 40 mass % and not greater than 70 mass % with respect to the total mass of the epoxy resin.

Another Epoxy Resin

The resin composition of the present technology may contain an epoxy resin other than the phosphorus-containing epoxy resin as necessary within a range that exhibits the effects of the present technology. Examples of such epoxy resins include bisphenol epoxy resins, novolac epoxy resins, trisphenol methane epoxy resins, glycidyl amine epoxy resins, aminophenol epoxy resins, naphthalene epoxy resins, and isocyanate-modified epoxy resins. Examples of the bisphenol epoxy resins include bisphenol A-type epoxy resins and bisphenol F-type epoxy resins. One type of these may be used alone, or two or more types may be used in a combination. Of these, bisphenol epoxy resins are preferable. A commercially available product may be used as a bisphenol epoxy resin. An example of the commercially available product of a bisphenol epoxy resin is a bisphenol A-type epoxy resin (trade name: YD-128, manufactured by Nippon Steel & Sumikin Chemical Co., Ltd.).

Amino-Terminated Liquid Rubber

The amino-terminated liquid rubber contains an amino-terminated liquid rubber having amino groups at both ends of the molecular chain. The amino-terminated liquid rubber has a function of forming crosslinking bonds by reacting the phosphorus-containing epoxy resin and an epoxy resin other than the phosphorus-containing epoxy resin. The amino-terminated liquid rubber has a rubber for the main chain and has reactive amino groups at both ends of the molecule, which makes it possible to impart toughness to the epoxy resin composition.

In the present technology, after crosslinking bonds are formed by reacting the amino-terminated liquid rubber and the phosphorus-containing epoxy resin in advance, an epoxy resin other than the phosphorus-containing epoxy resin having relatively higher reactivity than that of the phosphorus-containing epoxy resin, a curing agent, and a curing accelerator are compounded with the phosphorus-containing epoxy resin. As a result, it is possible to prevent the excessive formation of crosslinking bonds between the amino-terminated liquid rubber and an epoxy resin other than the phosphorus-containing epoxy resin, so the storage stability of the epoxy resin is enhanced. In addition, the toughness and resin fluidity of the epoxy resin are within moderate ranges, and the honeycomb sandwich peel strength of the cured product is enhanced.

The amino-terminated liquid rubber is not particularly limited as long as it has amino groups or imino groups at both ends of the molecular chain, and various amino-terminated liquid rubbers can be used within a range that exhibits the effects of the present technology. Examples of the amino-terminated liquid rubbers include amino-terminated butadiene-acrylonitrile rubber (ATBN), amino-terminated butadiene rubber (ATB), and the like having amino groups at both ends of the molecular chain. Of these, the amino-terminated liquid rubber is preferably an amino-terminated butadiene-acrylonitrile rubber from the perspective of ensuring that the toughness and resin fluidity of the epoxy resin composition are within moderate ranges and the honeycomb peel strength of the cured product is enhanced. The number average molecular weight of the amino-terminated liquid rubber is preferably not less than 500 and not greater than 50000. In addition, a commercially available product may be used as the amino-terminated liquid rubber. Examples of the commercially available products include trade names ATBN1300×35 and ATBN1300×13 (manufactured by CVC Thermoset Specialties).

The compounded amount of the amino-terminated liquid rubber is preferably not less than 5 parts by mass, more preferably not less than 5.5 parts by mass, and even more preferably not less than 6 parts by mass per 100 parts by mass of the total amount of the phosphorus-containing epoxy resin and an epoxy resin other than the phosphorus-containing epoxy resin contained in the epoxy resin composition from the perspective of sufficiently enhancing the honeycomb sandwich peel strength of a prepreg obtained using the epoxy resin composition, and is preferably not greater than 20 parts by mass, more preferably not greater than 17.5 parts by mass, and even more preferably not greater than 15 parts by mass from the perspective of preventing gelification and enhancing storage stability. Taking the above into consideration, the compounded amount of the amino-terminated liquid rubber is preferably not less than 1 part by mass and not greater than 20 parts by mass, more preferably not less than 3 parts by mass and not greater than 17.5 parts by mass, and even more preferably not less than 5 parts by mass and not greater than 15 parts by mass per 100 parts by mass of the total amount of the epoxy resin.

The compounded amount of the amino-terminated liquid rubber is preferably not less than 3 mass %, more preferably not less than 4 mass %, and even more preferably not less than 5 mass % with respect to the total mass of the epoxy resin composition from the perspective of sufficiently enhancing the honeycomb sandwich peel strength of a prepreg obtained using the epoxy resin composition, and is preferably not greater than 15 mass %, more preferably not greater than 12.5 mass %, and even more preferably not greater than 10 mass % from the perspective of preventing gelification and enhancing storage stability. Taking the above into consideration, the compounded amount of the amino-terminated liquid rubber is preferably not less than 3 mass % and not greater than 15 mass %, more preferably not less than 4 mass % and not greater than 12.5 mass %, and even more preferably not less than 5 mass % and not greater than 10 mass % with respect to the total mass of the epoxy resin.

Curing Agent

Various publicly known curing agents can be used within a scope that exhibits the effects of the present technology as long as the curing agents are capable of curing the epoxy resin. Examples of the curing agents include amines, acid anhydrides, novolac resins, phenols, mercaptan, Lewis acid amine complexes, onium salts, and imidazole. Of these, amine curing agents are preferable. Examples of the amine curing agents that can be used include aromatic amines such as diaminodiphenylmethane and diaminodiphenylsulfone, aliphatic amines, imidazole derivatives, dicyandiamide, tetramethylguanidine, thiourea-added amines, and isomers and modified products thereof. Dicyandiamide is preferable as a curing agent from the perspective of having excellent prepreg storage stability. In addition, a commercially available product may be used as a curing agent. An example of the commercially available product of a curing agent is trade name DICY-15 (dicyandiamide, manufactured by Mitsubishi Chemical Corporation).

The compounded amount of the curing agent is preferably not less than 0.5 parts by mass, more preferably not less than 1.0 parts by mass, and even more preferably not less than 2.0 parts by mass and preferably not greater than 15 parts by mass, more preferably not greater than 10 parts by mass, and even more preferably not greater than 7.5 parts by mass per 100 parts by mass of the total amount of the phosphorus-containing epoxy resin and an epoxy resin other than the phosphorus-containing epoxy resin contained in the epoxy resin composition. Taking the above into consideration, the compounded amount of the curing agent is preferably not less than 0.5 parts by mass and not greater than 15 parts by mass, more preferably not less than 1.0 parts by mass and not greater than 10 parts by mass, and even more preferably not less than 2.0 parts by mass and not greater than 7.5 parts by mass per 100 parts by mass of the total amount of the epoxy resin.

The compounded amount of the curing agent is preferably not less than 1 mass %, more preferably not less than 2 mass %, and even more preferably not less than 3 mass % and preferably not greater than 10 mass %, more preferably not greater than 7.5 mass %, and even more preferably not greater than 5 mass % with respect to the total mass of the epoxy resin composition. Taking the above into consideration, the compounded amount of the curing agent is preferably not less than 1 mass % and not greater than 10 mass %, more preferably not less than 2 mass % and not greater than 7.5 mass %, and even more preferably not less than 3 mass % and not greater than 5 mass % with respect to the total mass of the epoxy resin composition.

Curing Accelerator

A curing accelerator is a condensation catalyst for curing the epoxy resin composition and has a function of accelerating the curing reaction induced by the curing agent. The curing accelerator is not particularly limited as long as it has a function of accelerating the curing reaction of dicyandiamide, and a conventionally known curing accelerator may be used. Examples of the curing accelerators include phenylurea compounds represented by Formula (1) below, tertiary amines, imidazole compounds, urea compounds such as phenyl dimethylurea (PDMU), trifluoride monoethylamine, and amine complexes such as trichloride amine complexes. One type of these curing accelerators may be used alone, or two or more types may be used in a combination.

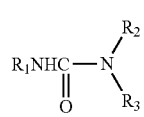

Formula (1)

(In Formula (1), $R_1$ is a phenyl group which may have a substituent. $R_1$ may have one or more substituents such as alkyl groups such as a methyl group, alkylene groups, uranyl groups, and halogens such as chlorine and bromine. $R_2$ and $R_3$ are alkyl groups which may have branches with not less than 1 and not more than 5 carbons. $R_2$ and $R_3$ may be the same as or different from one another.)

Examples of the alkyl groups of $R_2$ and $R_3$ which may have branches with not less than 1 and not more than 5 carbons in Formula (1) above include a hydrogen atom, a methyl group, an ethyl group, a propyl group, an isopropyl group, an n-butyl group, an s-butyl group, a t-butyl group, and an n-pentyl group. Of these, a methyl group and an ethyl group are preferable.

Examples of the phenylurea compounds represented by Formula (1) above include urea derivatives such as 1,1'-(4-methyl-1,3-phenylene)bis(3,3-dimethylurea), phenyl-dimethylurea represented by Formula (7) below, methylene-diphenyl-bisdimethylurea represented by Formula (8) below, 3-phenyl-1,1-dimethylurea represented by Formula (9) below, 3-(3-chlorophenyl)-1,1,-dimethylurea represented by Formula (10) below, 3-(3,4-dichlorophenyl)-1,1-dimethylurea (DCMU) represented by Formula (11) below, and 3-(3-chloro-4-methylphenyl)-1,1-dimethylurea. Of these, 1,1'-(4-methyl-1,3-phenylene)bis(3,3-dimethylurea), phenyl-dimethylurea represented by Formula (7) below, methylene-diphenyl-bisdimethylurea represented by Formula (8) below, and 3-phenyl-1,1-dimethylurea represented by Formula (9) below, are preferable, and 1,1'-(4-methyl-1,3-phenylene)bis(3,3-dimethylurea) is more preferable as a curing accelerator from the perspective of achieving sufficient curability of the epoxy resin composition and enhancing the toughness of the cured product.

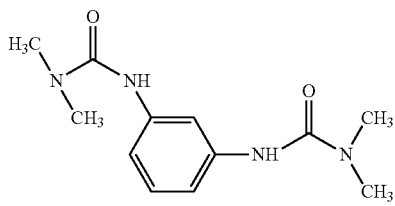

Formula (7)

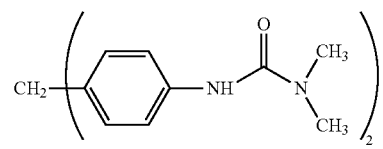

Formula (8)

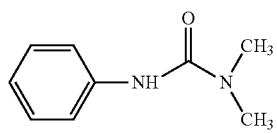

Formula (9)

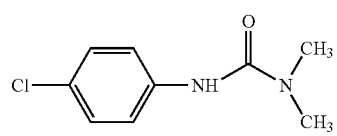

Formula (10)

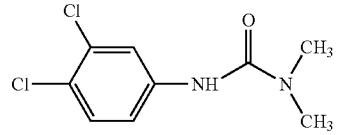

Formula (11)

A commercially available product may be used as a curing accelerator. An example of the commercially available product of a curing accelerator is trade name OMICURE 24 (1,1'-(4-methyl-1,3-phenylene)bis(3,3-dimethylurea), manufactured by CVC Thermoset Specialties).

The compounded amount of the curing accelerator is preferably not less than 0.5 parts by mass, more preferably not less than 1.0 parts by mass, and even more preferably not less than 2.0 parts by mass and preferably not greater than 15 parts by mass, more preferably not greater than 10 parts by mass, and even more preferably not greater than 7.5 parts by mass per 100 parts by mass of the total amount of the phosphorus-containing epoxy resin and an epoxy resin other than the phosphorus-containing epoxy resin contained in the epoxy resin composition from the perspective of further enhancing the fast curability of the obtained epoxy resin composition and from the perspective of increasing the glass transition temperature Tg of the epoxy resin composition after curing and further enhancing the durability after curing. Taking the above into consideration, the compounded amount of the curing accelerator is preferably not less than 0.5 parts by mass and not greater than 15 parts by mass, more preferably not less than 1.0 parts by mass and not greater than 10 parts by mass, and even more preferably not less than 2.0 parts by mass and not greater than 7.5 parts by mass.

The compounded amount of the curing accelerator is preferably not less than 1 mass %, more preferably not less than 2 mass %, and even more preferably not less than 3 mass % and preferably not greater than 10 mass %, more preferably not greater than 7.5 mass %, and even more preferably not greater than 5 mass % with respect to the total mass of the epoxy resin composition. Taking the above into consideration, the compounded amount of the curing accelerator is preferably not less than 1 mass % and not greater than 10 mass %, more preferably not less than 2 mass % and not greater than 7.5 mass %, and even more preferably not less than 3 mass % and not greater than 5 mass % with respect to the total mass of the epoxy resin.

Phenoxy Resin

The epoxy resin composition preferably contains a phenoxy resin from the perspective of enhancing the toughness of the epoxy resin composition and from the perspective of enhancing workability by controlling the viscosity of the uncured epoxy resin composition. Phenoxy resins are polyhydroxy polyethers synthesized from bisphenols and epichlorohydrin and are thermoplastic resins.

A phenoxy resin represented by Formula (12) below is preferable as a phenoxy resin.

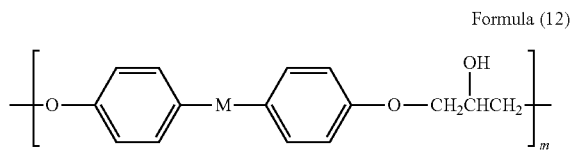

Formula (12)

(In Formula (12), M is at least one selected from $C(CH_3)_2$, $CH_2$, and $SO_2$ and may be a copolymer of two or more types thereof. m is a number of not less than 1 and not greater than 50.)

Examples of the phenoxy resins include bisphenol A-type phenoxy resins, bisphenol F-type phenoxy resins, bisphenol A-type and bisphenol F-type phenoxy resins, and bisphenol S-type phenoxy resins. A commercially available product may be used as a phenoxy resin. An example of the commercially available product of a phenoxy resin is trade name YP-75 (manufactured by Nippon Steel & Sumikin Chemical Co., Ltd.).

The weight average molecular weight of the phenoxy resin is preferably not less than 10000 and not greater than 100000 and more preferably not less than 20000 and not greater than 70000 from the perspective of imparting toughness to the epoxy resin composition.

The compounded amount of the phenoxy resin is preferably not less than 5 parts by mass, more preferably not less than 10 parts by mass, and even more preferably not less than 15 parts by mass per 100 parts by mass of the total amount of the phosphorus-containing epoxy resin and an epoxy resin other than the phosphorus-containing epoxy resin contained in the epoxy resin composition from the perspective of imparting toughness to the epoxy resin composition and controlling resin flow (overflow prevention), and is preferably not greater than 40 parts by mass, more preferably not greater than 35 parts by mass, and even more preferably not greater than 30 parts by mass from the perspective of maintaining the tack (surface tackiness), drape (flexibility to conform to a shape), heat resistance, solvent resistance, and the like of the resin when the epoxy resin composition is used as a prepreg. Taking the above into consideration, the compounded amount of the phenoxy resin is preferably not less than 0.5 parts by mass and not greater than 40 parts by mass, more preferably not less than 10 parts by mass and not greater than 35 parts by mass, and even more preferably not less than 15 parts by mass and not greater than 30 parts by mass per 100 parts by mass of the total amount of the epoxy resin.

The compounded amount of the phenoxy resin is preferably not less than 3 mass %, more preferably not less than 5 mass %, and even more preferably not less than 7 mass % and preferably not greater than 20 mass %, more preferably not greater than 17.5 mass %, and even more preferably not greater than 15 mass % with respect to the total mass of the epoxy resin composition. Taking the above into consideration, the compounded amount of the phenoxy resin is preferably not less than 3 mass % and not greater than 20 mass %, more preferably not less than 5 mass % and not greater than 17.5 mass %, and even more preferably not less than 7 mass % and not greater than 15 mass % with respect to the total mass of the epoxy resin.

The epoxy resin composition of the present technology may contain various additives as necessary within a range that exhibits the effects of the present technology in addition to the phosphorus-containing epoxy resin, an epoxy resin other than the phosphorus-containing epoxy resin, the amino-terminated liquid rubber, the curing agent, the curing accelerator, and the phenoxy resin described above. Examples of the additives include fillers, reaction retardants, anti-aging agents, antioxidants, pigments, dyes, plasticizers, silane coupling agents, thixotropic agents, adhesiveness-imparting agents, flame retardants, antistatic agents, UV (ultraviolet) absorbents, surfactants, dispersants, dehydrating agents, and solvents.

Examples of the fillers include organic fillers and inorganic fillers of various forms. Examples of the fillers include calcium carbonate, pyrophyllite clay, kaolin clay, calcined clay, silica sand, fumed silica, calcined silica, precipitated silica, pulverized silica, molten silica, diatomaceous earth, iron oxide, zinc oxide, titanium oxide, barium oxide, magnesium oxide, magnesium carbonate, zinc carbonate, carbon black, fatty acid, resin acid, fatty acid ester treated products, and fatty acid ester urethane compound treated products thereof.

Examples of the reaction retardants are alcohol compounds. Examples of the anti-aging agents include hindered phenol compounds and hindered amine compounds. Examples of the antioxidant include butylhydroxytoluene (BHT) and butylhydroxyanisole (BHA).

Examples of the pigments include various inorganic pigments and various organic pigments. Examples of the inorganic pigments include titanium dioxide, zinc oxide, ultramarine, iron red, lithopone, iron, cobalt, aluminum, hydrochlorides, sulfates, and carbon black. Examples of the organic pigments include azo pigments, phthalocyanine pigments, quinacridone pigments, quinacridonequinone pigments, dioxazine pigments, anthrapyrimidine pigments, anthanthrone pigments, indanthrone pigments, flavanthrone pigments, perylene pigments, perinone pigments, diketopyrrolopyrrole pigments, quinonaphthalone pigments, anthraquinone pigments, thioindigo pigments, benzimidazolone pigments, and isoindoline pigments.

Examples of the dyes include black dyes, yellow dyes, red dyes, blue dyes, and brown dyes.

Examples of the plasticizers include polypropyleneglycol, diisononyl phthalate (DINP), dioctyl phthalate (DOP), dibutyl phthalate (DBP), octyl adipate, isodecyl succinate, diethyleneglycol dibenzoate, pentaerythritol ester, butyl oleate, methyl acetyl ricinoleate, tricresyl phosphate, trioctyl phosphate, propylene glycol adipate polyester, butylene glycol adipate polyester, and phenyl alkylsulfonate. One type of these plasticizers may be used alone, or two or more types of these plasticizers may be used in a combination.

Examples of the silane coupling agents include trimethoxyvinylsilane and γ-glycidoxypropyltrimethoxysilane from the perspective of having an excellent effect of enhancing adhesiveness to wet surfaces and from the perspective of the ease of acquisition due to the agents being general-purpose compounds.

Specific examples of the thixotropic agents include Aerosil (manufactured by Nippon Aerosil) and Disparlon (manufactured by Kusumoto Chemicals, Ltd.).

Specific examples of the adhesion promoters include terpene resins, phenol resins, terpene-phenol resins, rosin resins, and xylene resins. Examples of the flame retardants include dimethyl-methyl phosphonates and ammonium polyphosphates.

Examples of the antistatic agents include hydrophilic compounds such as quaternary ammonium salts, polyglycols, and ethylene oxide derivatives.

Examples of the UV absorbers include 2-hydroxybenzophenone, benzotriazole, and salicylic acid esters.

Examples of the surfactants (leveling agents) include polybutyl acrylate, polydimethyl siloxane, and modified silicone compounds.

Examples of the dispersants include BYK-W961 and BYK-W935 (manufactured by BYK Chemicals Japan Co., Ltd.) as well as Polyflow No. 77 and Flowlen G700 (manufactured by Kyoeisha Chemical Co., Ltd.). An example of the dehydrating agent is vinylsilane.

Examples of the solvents include conventionally known solvents such as carbonate-based solvents such as dimethylcarbonate, ketone-based solvents such as acetone and methyl ethyl ketone (MEK), ester-based solvents such as ethyl acetate and butyl acetate, aliphatic solvents such as n-hexane, alicyclic solvents such as cyclohexane, aromatic solvents such as toluene, xylene, and cellosolve acetate, petroleum fraction-based solvents such as mineral spirits and industrial gasoline, and organic solvents. One type of solvent may be used alone, or two or more types may be used in a combination.

The epoxy resin composition of the present technology is prepared by mixing a phosphorus-containing epoxy resin and an amino-terminated liquid rubber to form a mixture and then reacting the mixture for not less than 10 minutes and not greater than 3 hours at a reaction temperature of not lower than 100° C. and not higher than 200° C. to form a reaction product. The epoxy resin composition can be obtained by then uniformly mixing the obtained reaction product, a curing agent, a curing accelerator, and other components such as a phenoxy resin or a plasticizer as necessary. An example of a method of mixing each of the components is a method using a mixer such as a three-roll mill, a planetary mixer, a kneader, an all-purpose agitator, a homogenizer, and a homodisper.

Prepreg

The epoxy resin composition of the present technology can be impregnated into a reinforced fiber and used as a prepreg. The reinforced fiber is not particularly limited, and various inorganic fibers or organic fibers such as carbon fibers, aramid fibers, nylon fibers, high-strength polyester fibers, glass fibers, boron fibers, alumina fibers, silicon nitride fibers, and steel fibers can be used. Of these, carbon fibers, aramid fibers, glass fibers, boron fibers, alumina fibers, and silicon nitride fibers are preferable from the perspective of flame retardancy. The form of the reinforced fiber may be aligned in one direction and may be a fabric or a non-crimped fabric.

A prepreg can be produced with a publicly known method using the epoxy resin composition of the present technology and a reinforced fiber. In addition, a fiber-reinforced composite material can be obtained by curing the obtained prepreg by heating.

Honeycomb Panel

The honeycomb panel of the present technology is obtained by laminating and curing the prepreg with a honeycomb core of the present technology. Because the prepreg of the present technology has excellent adhesiveness to the honeycomb core, the prepreg can be adhered to the honeycomb core without using an adhesive, and a fillet having high strength can be formed. This honeycomb panel has excellent fillet formability, fillet strength, mechanical strength, and workability. In addition, the honeycomb panel can, for example, be used as structure materials for aircrafts and automobiles.

Next, an example of a method for producing a honeycomb panel will be described. FIG. 1 is a schematic perspective view illustrating an example of a honeycomb panel. As illustrated in FIG. 1, a honeycomb panel 1 is obtained by adhering a prepreg 10 and a honeycomb core 11. The honeycomb panel 1 can be produced by bonding the prepreg 10 formed using the epoxy resin composition of the present technology to at least one of the ends 12 of the honeycomb core 11 having a honeycomb structure and thermally curing them by an autoclave or the like while press-bonding from both ends.

The honeycomb core 11 is not particularly limited. Examples of the honeycomb core 11 include at least one type selected from the group consisting of aramid honeycombs, aluminum honeycombs, paper honeycombs, and glass honeycombs. The size of the hexagonal column of honeycomb structural body of the honeycomb core 11 is not particularly limited; however, from the perspectives of strength and reduction in weight, the length of the cell size c of the honeycomb core 11 is preferably from 1/8 to 3/8 inches.

The heating temperature when the prepreg 10 and the honeycomb core 11 are bond and the curing conditions when the prepreg 10 and the honeycomb core 11 are bond may be such that, after the components are heated to not lower than 120° C. and not higher than 130° C. at a rate of from 2° C./min to 5° C./min and pressurization of from 2.5 kg/cm$^2$ to 4.0 kg/cm$^2$, the temperature is maintained at not lower than 120° C. and not higher than 130° C. for 2 hours and then lowered to room temperature thereafter at a rate of from 2° C./min to 5° C./min.

As described above, with the epoxy resin composition of this embodiment, a prescribed amount of an amino-terminated liquid rubber having high reactivity is reacted with a phosphorus-containing epoxy resin having moderately low reactivity, so a reaction product in which moderate cross-linking is established between the phosphorus-containing epoxy resin and the amino-terminated liquid rubber is obtained. Furthermore, because an epoxy resin having even higher reactivity, a curing agent, and a curing accelerator are compounded with this reaction product, sufficient crosslinking is established in the cured product of the epoxy resin composition for a fiber-reinforced composite material. As a result, it is possible to realize an epoxy resin composition for a fiber-reinforced composite material which is curable at a low temperature of approximately 120° C., yields excellent flame retardancy without using halogen-containing compounds and antimony trioxide, has excellent storage stability, and yields a cured product having excellent adhesiveness with a honeycomb core.

EXAMPLES

Next, examples performed to clarify the effects of the present technology will be described. Note that the present technology is not limited by the examples and comparative examples described below.

Epoxy Resin Composition Production

Example 1

A mixture prepared by mixing 80 parts by mass of a phosphorus-containing epoxy resin (trade name: FX-289z1, manufactured by Nippon Steel & Sumikin Chemical Co., Ltd.) and 10 parts by mass of an amino-terminated butadiene-acrylonitrile rubber (trade name: ATBN1300×35, manufactured by CVC Thermoset Specialties) was reacted for 1 hour at 150° C. to obtain a reaction product. Next, an epoxy resin composition was produced by uniformly mixing the obtained reaction product, 20 parts by mass of a bisphenol A-type epoxy resin (trade name: YD-128, manufactured by Nippon Steel & Sumikin Chemical Co., Ltd.), 15 parts by mass of a phenoxy resin (trade name: "YP-75", manufactured by Nippon Steel & Sumikin Chemical Co., Ltd.), 5 parts by mass of dicyandiamide (trade name: DICY-15, manufactured by Mitsubishi Chemical Corporation), and 5 parts by mass of 1,1'-(4-methyl-1,3-phenylene)bis(3,3-dimethylurea) (trade name: OMICURE 24, manufactured by CVC Thermoset Specialties). The compounded amounts of each of the components are shown in Table 1 below.

Example 2

An epoxy resin composition was produced in the same manner as in Example 1 with the exception that the compounded amount of the phosphorus-containing epoxy resin was set to 70 parts by mass, that the compounded amount of the amino-terminated butadiene-acrylonitrile rubber was set to 7.5 parts by mass, that the compounded amount of the bisphenol A-type epoxy resin was set to 30 parts by mass, and that the compounded amount of the phenoxy resin was set to 20 parts by mass. The compounded amounts of each of the components are shown in Table 1 below.

Comparative Example 1

An epoxy resin composition was produced in the same manner as in Example 1 with the exception that an amino-terminated butadiene-acrylonitrile rubber was not compounded, that the phosphorus-containing epoxy resin was not heated, and that the compounded amount of the phenoxy resin was set to 20 parts by mass. The compounded amounts of each of the components are shown in Table 1 below.

Comparative Example 2

An epoxy resin composition was produced in the same manner as in Comparative Example 1 with the exception that the phosphorus-containing epoxy resin was heated for 1 hour at 150° C. The compounded amounts of each of the components are shown in Table 1 below.

Comparative Example 3

An epoxy resin composition was produced in the same manner as in Example 1 with the exception that the compounded amount of the amino-terminated butadiene-acrylonitrile rubber was set to 20 parts by mass and that the compounded amount of the phenoxy resin was set to 20 parts by mass. The compounded amounts of each of the components are shown in Table 1 below.

Comparative Example 4

An epoxy resin composition was produced in the same manner as in Example 1 with the exception that the phosphorus-containing epoxy resin and the amino-terminated butadiene-acrylonitrile rubber were not reacted for 1 hour at 150° C. The compounded amounts of each of the components are shown in Table 1 below.

Comparative Example 5

An epoxy resin composition was produced in the same manner as in Example 1 with the exception that a carboxy-terminated butadiene-acrylonitrile rubber (trade name: CTBN1300×13, manufactured by CVC Thermoset Specialties) was used instead of an amino-terminated butadiene-acrylonitrile rubber and that the compounded amount of the phenoxy resin was set to 20 parts by mass. The compounded amounts of each of the components are shown in Table 1 below.

Comparative Example 6

An epoxy resin composition was produced in the same manner as in Example 1 with the exception that 100 parts by mass of a bisphenol A-type epoxy resin was compounded instead of a phosphorus-containing epoxy resin and that a phenoxy resin was not used. The compounded amounts of each of the components are shown in Table 1 below.

Prepreg Production

Prepregs were produced by impregnating glass fabric (fiber basis weight: 104 g/m$^2$) with the epoxy resin compositions of Examples 1 and 2 and Comparative Examples 1 to 6 so that the resin content was 45% (resin weight: 85 g/m$^2$).

Test Methods

Storage stability was evaluated using the obtained prepregs. In addition, flame retardancy and peel strength were evaluated using a cured product (fiber-reinforced composite material) obtained by curing the prepreg for two hours at 120° C. in an autoclave.

Storage Stability

Storage stability was evaluated by touching the obtained prepreg with a finger in an environment at 25° C. to assess the presence or absence of tack (adhesive force) after the obtained prepreg was exposed to room temperature for 14 days. Tack was evaluated by hand using the following criteria.

Good: sufficient adhesive force is felt on the surface of the plate

Fail: gelified

Flame Retardancy

Figure 2:
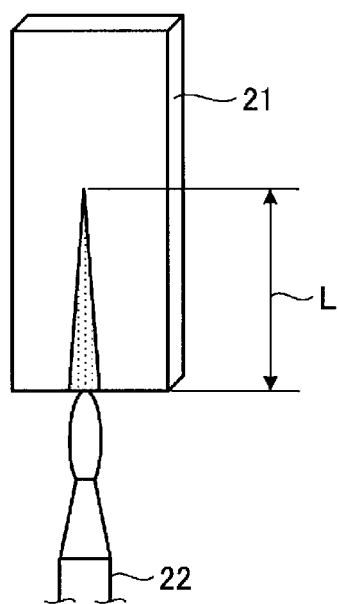
FIG. 2 is an explanatory diagram of a vertical flame test according to an example of the present technology.

A fiber-reinforced composite material prepared by laminating six prepregs and curing the prepregs in an autoclave was cut to a size of 7.62 cm×30.48 cm to produce a test piece. Flame retardancy was evaluated with a vertical flame test using the produced test piece. FIG. 2 illustrates the state of a vertical flame test. As illustrated in FIG. 2, a test piece 21 was fixed vertically, and after the test piece was subjected to flame for 60 seconds from directly beneath the test piece 21 using a burner 22, the length L of the spread of fire was measured. When the length L of the spread of fire was 15.24 cm or less, it was assessed that the heat resistance was good.

Peel Strength

Three prepregs were laminated, and after the laminated product was placed on both sides of a honeycomb core (trade name: Glass Honeycomb HRP-3/16-4.0, manufactured by Hexcel Co., Ltd.), the product was placed in a bag and cured for 2 hours at 120° C. in an autoclave to produce a honeycomb panel. During the curing, the autoclave was pressurized to an internal pressure of 0.32 MPa.

The peel strength (N-m/m) of the test piece at a temperature of 23° C. (dry state) of a sample of the obtained honeycomb panel was measured in accordance with ASTM D1781, where each of the face plates disposed on the upper side (bag side: face contacting the vacuum bag) and the lower side (tool side: face contacting the molding jig) of the honeycomb core were machined to predetermined dimensions, and the honeycomb sandwich peel strength was determined.

In contrast, it can be seen that when an amino-terminated butadiene-acrylonitrile rubber is not compounded, the peel strength decreases dramatically regardless of whether the phosphorus-containing epoxy resin is heated (Comparative Examples 1 and 2). This result may be due to the fact that sufficient peel strength was not achieved because crosslinking was not established between the phosphorus-containing epoxy resin and the amino-terminated butadiene-acrylonitrile rubber.

TABLE 1

| | | Examples | | Comparative Examples | | | | | |
|---|---|---|---|---|---|---|---|---|---|
| | | 1 | 2 | 1 | 2 | 3 | 4 | 5 | 6 |
| Formulation 1 | Epoxy resin 1 | 80 | 70 | 80 | 80 | 80 | 80 | 80 | |
| | Epoxy resin 2 | | | | | | | | 100 |
| | Liquid NBR 1 | 10 | 7.5 | | | 20 | 10 | | 10 |
| | Liquid NBR 2 | | | | | | | 10 | |
| | Rubber/epoxy ratio (%) | 12.5 | 10.7 | 0.0 | 0.0 | 25.0 | 12.5 | 12.5 | 10.0 |
| Reaction conditions | Reaction temperature (° C.) | 150 | 150 | — | 150 | 150 | — | 150 | 150 |
| | Reaction time (h) | 1 | 1 | — | 1 | 1 | — | 1 | 1 |
| Formulation 2 | Epoxy resin 2 | 20 | 30 | 20 | 20 | 20 | 20 | 20 | |
| | Phenoxy resin | 15 | 20 | 20 | 20 | 20 | 15 | 20 | |
| | Curing agent | 5 | 5 | 5 | 5 | 5 | 5 | 5 | 5 |
| | Curing accelerator | 5 | 5 | 5 | 5 | 5 | 5 | 5 | 3 |
| Phosphorus content (wt. %) | | 1.19 | 1.02 | 1.23 | 1.23 | 1.07 | 1.19 | 1.14 | 0.00 |
| Total compounded amount | | 135 | 138 | 130 | 130 | 150 | 135 | 140 | 118 |
| Evaluation | Storage stability | Good | Good | Good | Good | Fail | Fail | Good | Fail |
| | Flame retardancy (cm) | 5.2 | 5.8 | 4.9 | 5.1 | — | — | 5.4 | — |
| | Peel strength (N-m/m) | 19 | 18 | 5.6 | 8.9 | — | — | 6.7 | — |

The details of each of the components of each of the examples and comparative examples shown in Table 1 are as follows.

Epoxy resin 1: phosphorus-containing epoxy resin (trade name: FX-289z1, manufactured by Nippon Steel & Sumikin Chemical Co., Ltd.)

Epoxy resin 2: bisphenol A-type epoxy resin (trade name: YD-128, manufactured by Nippon Steel & Sumikin Chemical Co., Ltd.)

Liquid NBR resin 1: amino-terminated butadiene-acrylonitrile rubber (trade name: ATBN1300×35, manufactured by CVC Thermoset Specialties)

Liquid NBR resin 2: carboxy-terminated butadiene-acrylonitrile rubber (trade name: CTBN1300×13, manufactured by CVC Thermoset Specialties)

Phenoxy resin: trade name "YP-75", manufactured by Nippon Steel & Sumikin Chemical Co., Ltd.

Curing agent: dicyandiamide (trade name: DICY-15, manufactured by Mitsubishi Chemical Corporation)

Curing accelerator: 1,1'-(4-methyl-1,3-phenylene)bis(3,3-dimethylurea) (trade name: OMICURE 24, manufactured by CVC Thermoset Specialties)

As is clear from Table 1, it can be seen that an epoxy resin which has excellent storage stability and yields a prepreg having good flame retardancy and peel strength is obtained by mixing a reaction product obtained by reacting a phosphorus-containing epoxy resin and an amino-terminated butadiene-acrylonitrile rubber in advance, a bisphenol A-type epoxy resin, a phenoxy resin, a curing agent, and a curing accelerator (Examples 1 and 2). This result may be due to the fact that moderate crosslinking was established by reacting an amino-terminated butadiene-acrylonitrile rubber having high reactivity and a phosphorus-containing epoxy resin having moderately low reactivity and that excessive reactions between the amino-terminated butadiene-acrylonitrile rubber and the bisphenol A having high reactivity were suppressed.

In addition, it can be seen that when the compounded amount of the amino-terminated butadiene-acrylonitrile rubber was too large and when the phosphorus-containing epoxy resin and the amino-terminated butadiene-acrylonitrile rubber were not reacted in advance, storage stability was dramatically diminished (Comparative Examples 3 and 4). This result may be due to the fact that unreacted amino-terminated butadiene-acrylonitrile rubber remained, and the bisphenol epoxy resin having high reactivity and the amino-terminated butadiene-acrylonitrile rubber reacted to form excessive crosslinking.

Furthermore, it can be seen that when a carboxy-terminated butadiene-acrylonitrile rubber was used, the peel strength decreases dramatically (Comparative Example 5). This result may be due to the fact that in the case of a carboxy-terminated butadiene-acrylonitrile rubber, which has relatively lower reactivity than an amino-terminated butadiene-acrylonitrile rubber, sufficient peel strength was not achieved because sufficient crosslinking was not established between the carboxy-terminated butadiene-acrylonitrile rubber and the phosphorus-containing epoxy resin having low reactivity.

Furthermore, it can be seen that when a phosphorus-containing epoxy resin is not compounded, storage stability decreases dramatically (Comparative Example 6). This result may be due to the fact that excessive crosslinking was established between the amino-terminated butadiene-acrylonitrile rubber having high reactivity and the bisphenol A-type epoxy resin having high reactivity.

The invention claimed is:

1. An epoxy resin composition for a fiber-reinforced composite material comprising:
    a reaction product obtained by reacting 100 parts by mass of a phosphorus-containing epoxy resin containing a phosphorus atom in a backbone thereof, and not less than 5 parts by mass and not greater than 20 parts by mass of an amino-terminated liquid rubber;
an epoxy resin different than the phosphorus-containing epoxy resin;
a curing agent; and
a curing accelerator; wherein:
a compounded amount of the phosphorus-containing epoxy resin is not less than 50 parts by mass and not greater than 95 parts by mass per 100 parts by mass of a total amount of the phosphorus-containing epoxy resin and the epoxy resin different than the phosphorus-containing epoxy resin;
a compounded amount of the phosphorus-containing epoxy resin is not less than 30 mass % and not greater than 80 mass % with respect to the total mass of the epoxy resin composition; and
the phosphorus-containing epoxy resin has lower reactivity than that of the epoxy resin different than the phosphorus-containing epoxy resin, and the reaction product has crosslinking as a result of the reaction between the phosphorus-containing epoxy resin and the amino-terminated liquid rubber.

2. The epoxy resin composition for a fiber-reinforced composite material according to claim 1, wherein the amino-terminated liquid rubber is an amino-terminated butadiene-acrylonitrile rubber.

3. The epoxy resin composition for a fiber-reinforced composite material according to claim 1, wherein the curing accelerator contains at least one type selected from the group consisting of phenylurea-based compounds represented by Formula (1):

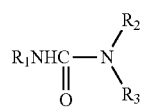

Formula (1)

where $R_1$ is a phenyl group and $R_2$ and $R_3$ are alkyl groups.

4. The epoxy resin composition for a fiber-reinforced composite material according to claim 1, wherein the curing agent is dicyandiamide.

5. The epoxy resin composition for a fiber-reinforced composite material according to claim 1, wherein a phosphorus content of the phosphorus-containing epoxy resin is not less than 0.5 mass % and not greater than 5.0 mass %.

6. The epoxy resin composition for a fiber-reinforced composite material according to claim 1, wherein a content of the curing accelerator is not less than 1 part by mass and not greater than 15 parts by mass per 100 parts by mass of a sum of a mass of the phosphorus-containing epoxy resin and a mass of the other epoxy resin.

7. The epoxy resin composition for a fiber-reinforced composite material according to claim 1, further comprising a phenoxy resin.

8. The epoxy resin composition for a fiber-reinforced composite material according to claim 7, wherein a content of the phenoxy resin is not less than 5 parts by mass and not greater than 40 parts by mass per 100 parts by mass of a sum of a mass of the phosphorus-containing epoxy resin and a mass of the other epoxy resin.

9. A method for producing an epoxy resin composition for a fiber-reinforced composite material, the method comprising:

reacting 100 parts by mass of a phosphorus-containing epoxy resin containing a phosphorus atom in a backbone thereof and not less than 5 parts by mass and not greater than 20 parts by mass of an amino-terminated liquid rubber for not less than 10 minutes and not greater than 3 hours at a reaction temperature of not lower than 100° C. and not higher than 200° C. to obtain a reaction product; and
mixing the reaction product, an epoxy resin different than the phosphorus-containing epoxy resin, a curing agent, and a curing accelerator to obtain an epoxy resin composition for a fiber-reinforced composite material wherein a compounded amount of the phosphorus-containing epoxy resin is not less than 50 parts by mass and not greater than 95 parts by mass per 100 parts by mass of a total amount of the phosphorus-containing epoxy resin and the epoxy resin different than the phosphorus-containing epoxy resin; a compounded amount of the phosphorus-containing epoxy resin is not less than 30 mass % and not greater than 80 mass % with respect to the total mass of the epoxy resin composition; and the phosphorus-containing epoxy resin has lower reactivity than that of the epoxy resin different than the phosphorus-containing epoxy resin, and the reaction product has crosslinking as a result of the reaction between the phosphorus-containing epoxy resin and the amino-terminated liquid rubber.

10. A prepreg obtained by impregnating a reinforced fiber with the epoxy resin composition for a fiber-reinforced composite material according to claim 1.

11. A honeycomb panel obtained by laminating and curing the prepreg according to claim 10 and a honeycomb core.

12. The honeycomb panel according to claim 11, wherein the honeycomb core is at least one type selected from the group consisting of an aramid honeycomb, an aluminum honeycomb, a paper honeycomb, and a glass honeycomb.

13. The epoxy resin composition for a fiber-reinforced composite material according to claim 2, wherein the curing accelerator contains at least one type selected from the group consisting of phenylurea-based compounds represented by Formula (1):

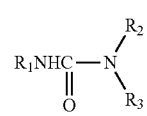

Formula (1)

where $R_1$ is a phenyl group and $R_2$ and $R_3$ are alkyl groups.

14. The epoxy resin composition for a fiber-reinforced composite material according to claim 13, wherein the curing agent is dicyandiamide.

15. The epoxy resin composition for a fiber-reinforced composite material according to claim 14, wherein a phosphorus content of the phosphorus-containing epoxy resin is not less than 0.5 mass % and not greater than 5.0 mass %.

16. The epoxy resin composition for a fiber-reinforced composite material according to claim 15, wherein a content of the curing accelerator is not less than 1 part by mass and not greater than 15 parts by mass per 100 parts by mass of a sum of a mass of the phosphorus-containing epoxy resin and a mass of the other epoxy resin.

17. The epoxy resin composition for a fiber-reinforced composite material according to claim 16, further comprising a phenoxy resin.

18. The epoxy resin composition for a fiber-reinforced composite material according to claim 17, wherein a content of the phenoxy resin is not less than 5 parts by mass and not greater than 40 parts by mass per 100 parts by mass of a sum of a mass of the phosphorus-containing epoxy resin and a mass of the other epoxy resin.

19. A prepreg obtained by impregnating a reinforced fiber with the epoxy resin composition for a fiber-reinforced composite material according to claim 18.

20. A honeycomb panel obtained by laminating and curing the prepreg according to claim 19 and a honeycomb core, wherein the honeycomb core is at least one type selected from the group consisting of an aramid honeycomb, an aluminum honeycomb, a paper honeycomb, and a glass honeycomb.

* * * * *